US006939581B2

(12) United States Patent
Sanguineti et al.

(10) Patent No.: US 6,939,581 B2
(45) Date of Patent: Sep. 6, 2005

(54) PROCESS FOR IMPREGNATING SUPPORTS

(75) Inventors: Aldo Sanguineti, Milan (IT); Andrea Perego, Milan (IT)

(73) Assignee: Solvay Solexis S.p.A., Milan (IT)

( * ) Notice: Subject to any disclaimer, the term of this patent is extended or adjusted under 35 U.S.C. 154(b) by 0 days.

(21) Appl. No.: 10/214,730

(22) Filed: Aug. 9, 2002

(65) Prior Publication Data

US 2003/0035898 A1 Feb. 20, 2003

(30) Foreign Application Priority Data

Aug. 9, 2001 (IT) ..................................... MI2001A1745

(51) Int. Cl.[7] .................................................. B05D 3/02
(52) U.S. Cl. .................... 427/385.5; 427/337; 427/340; 427/341; 427/352; 427/353; 427/372.2; 427/430.1
(58) Field of Search ........................... 427/385.5, 372.2, 427/430.1, 337, 340, 341, 352, 353

(56) References Cited

U.S. PATENT DOCUMENTS

| | | | | |
|---|---|---|---|---|
| 4,035,565 A | | 7/1977 | Apotheker et al. | ......... 526/249 |
| 4,243,770 A | | 1/1981 | Tatemoto et al. | ........... 525/340 |
| 4,255,523 A | * | 3/1981 | Ukihashi et al. | .............. 521/27 |
| 4,269,749 A | | 5/1981 | Marriott et al. | .............. 524/159 |
| 4,453,991 A | | 6/1984 | Grot | ............................ 156/94 |
| 4,564,662 A | | 1/1986 | Albin | ......................... 526/247 |
| 4,694,045 A | | 9/1987 | Moore | ......................... 525/276 |
| 4,745,165 A | | 5/1988 | Arcella et al. | ............... 526/247 |
| 4,789,717 A | | 12/1988 | Giannetti et al. | ........... 526/209 |
| 4,791,081 A | | 12/1988 | Childress et al. | ............. 502/62 |
| 4,864,006 A | | 9/1989 | Giannetti et al. | ........... 526/209 |
| 4,940,525 A | * | 7/1990 | Ezzell et al. | ................. 204/252 |
| 4,943,622 A | | 7/1990 | Naraki et al. | ................ 526/206 |
| 5,173,553 A | | 12/1992 | Albano et al. | ............... 526/238 |
| 5,547,551 A | * | 8/1996 | Bahar et al. | ................. 204/296 |
| 5,746,954 A | * | 5/1998 | Aikman, Jr. | .................. 264/87 |
| 5,993,907 A | | 11/1999 | Aikman, Jr. | ................. 427/341 |
| 6,130,175 A | * | 10/2000 | Rusch et al. | ................... 442/77 |
| 2002/0002240 A1 | * | 1/2002 | Michot et al. | ............... 525/102 |

FOREIGN PATENT DOCUMENTS

| | | |
|---|---|---|
| EP | 0 136 596 A2 | 4/1985 |
| EP | 0 199 138 A2 | 10/1986 |
| EP | 0 326083 | 8/1989 |
| EP | 0 410 351 A1 | 1/1991 |
| WO | WO 97/40924 | 11/1997 |
| WO | WO 99/38697 | 8/1999 |

* cited by examiner

*Primary Examiner*—Elena Tsoy
(74) *Attorney, Agent, or Firm*—Arent Fox PLLC

(57) ABSTRACT

An impregnation process of a porous support including immersing the support in an aqueous colloidal dispersion of ionomeric (per)fluorinated polymer, containing suiphonyl fluoride groups and having a concentration greater than 15% by weight, thermal treatment at 200° C. or less, conversion of the ionomer sulphonyl groups into the corresponding salts, ionomer crosslinking when ionomer equivalent weight is less than 650 g/eq.

15 Claims, No Drawings

PROCESS FOR IMPREGNATING SUPPORTS

The present invention relates to a process for impregnating a porous polymer support with an ionomeric fluorinated polymer to obtain transparent thin membranes, occluded to the ga flow, usable in fuel cells and in electrochemical processes, or in applications such for example chemical or physical type separations, as indicated hereafter.

The polymer membranes based on perfluorinated ionomers are used in electrochemical applications and generally in applications where the separation of electrolytic mixtures or the selective transport of alkaline metal cations is necessary. Specifically, they are used in fuel cells, in chloro-soda cells, in dialysis systems, electrodialysis, pervaporation and vapour separation by selective permeation.

Said membranes can be prepared by extrusion of the polymers in thermoplastic form, having functional groups convertible into ionic groups, for example polymers having $—SO_2F$ groups and subsequent conversion into ionic form. Or the membranes can be prepared by using solutions of fluorinated ionomeric polymer in suitable solvent mixtures.

To be used in particular in fuel cells, the membranes must have the following combination of properties: low electric resistance, sufficient mechanical consistency to be used for the whole cell lifetime and they must also be not permeable to oxygen to avoid the electrode poisoning. In the cells it is advantageous to have the lowest membrane thickness as possible to decrease the internal resistance of the membrane to the protonic conductivity. However it is not possible to use membranes having a low thickness and formed, as it would be preferable, by the sole fluorinated ionomer, since said membranes would not have sufficient mechanical properties for the use. Indeed the thin membranes must be reinforced for the use in fuel cells.

To obtain membranes having good mechanical properties it is known in the prior art to prepare composite membranes by impregnation of a porous perfluorinated support with fluorinated ionomer solutions having the functional groups under the form of sulphonic acid.

In U.S. Pat. No. 5,547,551 composite membranes are described, having a thickness lower than 0.025 mm, not permeable to gases (Gurley number>10,000), obtained by an impregnation process of a polytetrafluoroethylene porous support with a fluorinated ionomeric polymer, wherein polymer hydroalcoholic solutions in $—SO_3H$ form are used. Said process has the drawback to use flammable solvents and which are also polluting for the environment. The hydroalcoholic solutions used in said patent (Nafion® NR50) can be prepared according to U.S. Pat. No. 4,453,991, describing a process wherein the ionomer in $—SO_3H$ form is solubilized in mixtures of water and organic solvents miscible with water, by heating in autoclave at temperatures in the range 180° C.–300° C. The dissolution at high temperature of a superacid, as the fluorinated ionomers in the sulphonic acid form, shows remarkable problems of plant corrosion. It is clear that the whole process for preparing said membranes, based on the combination of the two above patents, is industrially expensive.

A further drawback of said solutions is that the ionomer amount in $—SO_3H$ form can reach at most concentrations of 5–10% by weight. At higher concentrations the viscosity significantly increases and said solutions are no more usable. Besides, if a porous support must be impregnated by immersion it is necessary to repeat the process several times to increase the ionomer amount on the membrane. Tests carried out by the Applicant have shown that the ionomer amount which can be transferred on the support, by using the immersion technique, is about 30%.

Higher amounts of ionomer in the finished membrane are desirable to increase the membrane use time in the fuel cells.

From the industrial point of view the process used to obtain the membrane is much more advantageous the more the number of steps required for the support impregnation is reduced, for example when the immersion process is used.

U.S. Pat. No. 5,993,907 describes a process to coat a polytetrafluoroethylene substratum in fibrils or in powder with a thin coating of perfluorinated ionomer in acid ($—SO_3H$) or salified form. The process uses a polymer dispersion having a low surface tension, containing the polymer precursor having functional sulphonyl fluoride groups. According to said process the specimen is immersed in the ionomeric dispersion under the $—SO_2F$ form and subsequently, to obtain the deposition on the substratum, the so coated specimen is immersed in a saline or acid solution having sufficient ionic force. Then the mixture is heated to 330°–355° C. to allow the coating adhesion to the substratum. The polymer functional groups are then converted into the corresponding sulphonic acid groups. This process requiring high temperatures of the thermal treatment to favour the coating adhesion to the substratum, is not applicable to porous substrata, in particular to the bistretched PTFE. See comparative Examples. From said patent no teaching is drawn to prepare occluded membranes by using porous supports. U.S. Pat. No. 4,791,081 describes the preparation of a heterogeneous acid catalyst, which is carried out by coating the surface of a support with an aqueous emulsion containing a fluorinated polymer having functional $—SO_2F$ groups. According to the process described in said patent, after having removed the water excess, the catalyst is heated at a temperature higher than the softening point of the sulphonic polymer. In the final step the functional groups of the ionomeric polymer are converted into their acid form. The supports for the catalyst are those conventional, and in the patent alumina, silica, zeolites, silicon carbide, alumina silica, glass, ceramic, spinel, clay, carbon are mentioned. The ratio by weight between polymer and support ranges from 0.1 to 50% by weight, corresponding to a percentage by weight of ionomer on the total weight ionomer+catalyst from 0.1% to 33%. In this range and depending on the support used and on the reaction wherein the catalyst must be used, the polymer amount on the support reaches the optimal values for the catalyst productivity. The Examples of said patent illustrate the preparation of the heterogeneous catalyst starting from a latex of a fluorinated polymer having functional sulphonylfluoride groups, and using as a support alumina or silicon carbide. The polymer amount deposited on the support is at most about 16%. The Applicant has verified that the process of said patent is not applicable if a porous polymer support, for example bistretched porous PTFE, is used, since the ionomer does not adhere to the support and easily comes out. For this reason the obtained membranes are unusable, for example for electrochemical cells.

The need was felt to have available a process to prepare thin membranes, occluded to the gas flow, starting from a porous polymer support, wherein the impregnation was carried out using an ionomeric polymer dispersion in water, avoiding both the use of solutions in hydroalcoholic mixtures of the ionomers in acid form and the use of high temperatures, higher than 200° C., as indicated in the prior art.

An object of the present invention is an impregnation process of a porous support, formed by a polymer compound inert under the use conditions, said process carried out by using colloidal dispersions in water of thermoplastic (per) fluorinated polymers containing the following functional groups:

functional groups convertible into —SO₃H, such for example sulphonyl halide, in particular sulphonyl fluoride, or functional groups convertible into —COOH, such for example acylhalide and in particular acylfluoride, said aqueous dispersions of thermoplastic (per)fluorinated polymers obtainable by polymerization in emulsion of the following monomers:

(A) monomeric units deriving from one or more (per) fluorinated monomers, containing at least one ethylene unsaturation, and (B) one or more (per)fluorinated comonomers containing functional groups convertible into the above acid groups, said process comprising the following steps:

1) preparation of an aqueous colloidal dispersion of thermoplastic (per)fluorinated polymers by polymerization in emulsion of at least the following monomers:

(A) monomeric units deriving from one or more (per) fluorinated monomers, containing at least one ethylene unsaturation, and (B) one or more (per)fluorinated comonomers containing functional groups convertible into the above acid groups;

2) a) concentration or dilution of the dispersion obtained in 1) so as to obtain a solid content in the latex from 10% to 65% by weight, preferably from 20% to 50% by weight;

b) optional addition of surfactants to obtain a dispersion having a surface tension lower than 40 mN/m, preferably lower than 30;

3) impregnation of the porous support with the latex obtained in 2b);

4) thermal treatment at a temperature of 20° C., preferably of 50° C., higher than the glass transition temperature of the ionomeric polymer in thermoplastic form, and lower or equal to 200° C., preferably working at a temperature in the range 80° C.–200° C., more preferably 120° C.–200° C.;

5) a) crosslinking of the ionomeric polymer when it has equivalent weight lower than 650 g/eq, b) conversion of the functional groups in the corresponding form of salts with acids (carboxylic or sulphonic), by contacting the membrane with a basic aqueous solution, at temperatures comprised between 60° C. and the boiling temperature of the aqueous solution, and subsequent washings by immersion of the membrane in deionized water at room temperature, until obtaining an almost neutral pH of the washing waters;

6) optionally, membrane treatment by immersion at room temperature in an acid aqueous solution of a strong inorganic acid, preferably nitric or hydrochloric acid, at a concentration such to allow the substantially complete exchange between the ion H⁺ and the cation of the base used in the previous step, and subsequent washings by immersion in deionized water up to an about neutral pH of the washing waters.

The crosslinking of step 5a) is optional when the polymer has equivalent weight higher than 650 g/eq, preferably higher than 750 g/eq.

Optionally steps 3) and 4) are repeated until obtaining a completely occluded membrane with Gurley number>10,000 (ASTM D726-58).

Preferably the invention membranes are transparent. These can be obtained for example by immersion of the support in the latex (step 3) having a dry concentration (polymer) higher than 15% by weight. If one operates with latexes at concentrations higher than 20% by weight of dry polymer, transparent membranes are obtained by immersion of the support in the latex even in a single passage; i.e. steps 3 and 4 are not repeated. This represents a remarkable advantage from the industrial point of view.

When a latex having a concentration of about 10% by weight of polymer is used, it is necessary a higher number of passages, anyway always in a limited number, to obtain an ionomer amount in the membrane of about 40% by weight. By immersion a number of passages lower than 10 is sufficient.

The Applicant has unexpectedly and surprisingly found that porous supports can be impregnated by using polymerization latexes of fluorinated ionomers with groups convertible into acids, provided that they have the surface tension indicated in step 2b). However this step is not sufficient to obtain the definitive support impregnation after step 5). In fact it has been found that it is essential to carry out step 4). The latex surface tension determination is effected according to the method indicated in the Examples.

The porous support used in the invention process is a membrane having (a) a porous structure containing knots linked each other by fibrils, and/or (b) a porous structure formed by only interconnected fibrils, or (c) a tissue.

These porous supports are available on the market.

Preferably the porous support is a membrane of the type (a), formed by foamed (bistretched) PTFE having a porosity (pore average size) 0.2 micron. This support is sold by W. L. Gore & Associates, Inc., Elkton. Md., with the trademark GORE-TEX®.

Preferably the used support has a thickness from 1 to 100 micron, preferably lower than 25 micron.

The thermoplastic (per)fluorinated polymers precursors of the fluorinated ionomers have equivalent weight from 380 to 1,800, preferably from 550 to 1,200 g/eq.

Preferably in said thermoplastic polymers the (per) fluorinated monomers of type (A) are selected from the following:

vinylidene fluoride (VDF);

$C_2$–$C_8$ perfluoroolefins, preferably tetrafluoroethylene (T-FE);

$C_2$–$C_8$ chloro- and/or bromo- and/or iodo-fluoroolefins, such as chlorotrifluoroethylene (CTFE) and bromotrifluoroethylene;

(per)fluoroalkylvinylethers (PAVE) $CF_2$=$CFOR_f$, wherein $R_f$ is a $C_1$–$C_6$ (per)fluoroalkyl, for example trifluoromethyl, bromodifluoromethyl, pentafluoropropyl;

perfluoro-oxyalkylvinylethers $CF_2$=$CFOX$, wherein X is a $C_1$–$C_{12}$ perfluoro-oxyalkyl having one or more ether groups, for example perfluoro-2-propoxy-propyl.

Preferably the fluorinated monomers of type (B) are selected from one or more of the following:

$F_2C$=$CF$—$O$—$CF_2$—$CF_2$—$SO_2F$;

$F_2C$=$CF$—$O$—[$CF_2$—$CXF$—$O$]$_n$—$CF_2$—$CF_2$—$SO_2F$;

wherein X=Cl, F or $CF_3$; n=integer from 1 to 10;

$F_2C$=$CF$—$O$—$CF_2$—$CF_2$—$CF_2$—$SO_2F$;

$F_2C$=$CF$—$Ar$—$SO_2F$ wherein Ar is an aryl ring;

$F_2C$=$CF$—$O$—$CF_2$—$CF_2$—$CF_2$—$COF$;

$F_2C$=$CF$—$O$—[$CF_2$—$CXF$—$O$]$_n$—$CF_2$—$CFX$—$COF$;

wherein X=Cl, F or $CF_3$; n is as above.

Optionally the (per)fluorinated ionomers of the invention can contain from 0.01 to 5% by moles of monomeric units deriving from a bis-olefin of formula:

$$(R_1R_2)C=CH-(CF_2)_m-CH=C(R_5R_6) \qquad (I)$$

wherein:
m is an integer from 2 to 10, preferably from 4 to 8;
$R_1$, $R_2$, $R_5$, $R_6$, equal to or different from each other, are H or $C_1-C_5$ alkyl groups.

The introduction as comonomer of the bis-olefin of formula (I), having an unsaturation number higher than the unit, is advantageous since the comonomer has the purpose to pre-crosslink the ionomer during the polymerization. The introduction of the bis-olefin has furthermore the advantage to increase the length of the primary chains forming the final reticule.

Preferably the fluorinated ionomers of the invention comprise:
monomeric units deriving from TFE;
monomeric units deriving from $CF_2=CF-O-CF_2CF_2SO_2F$;
optionally, monomeric units deriving from the bis-olefin of formula (I);
optionally, iodine atoms in terminal position.

As regards the introduction in the chain of said iodine and/or bromine atoms, it can be effected by addition in the reaction mixture, of brominated and/or iodinated cure-site comonomers, such as bromo and/or iodo olefins having from 2 to 10 carbon atoms (as described for example in U.S. Pat. Nos. 4,035,565 and 4,694,045), or iodo and/or bromo fluoro-alkylvinylethers (as described in U.S. Pat. Nos. 4,745, 165, 4,564,662 and EP 199,138), in such amounts whereby the cure-site comonomer content in the final product is generally comprised between 0.05 and 2 moles per 100 moles of the other basis monomeric units.

Alternatively, or also in combination with cure-site comonomers, it is possible to introduce iodine and/or bromine end atoms by addition to the reaction mixture of iodinated and/or brominated chain transfer agents, such for example the compounds of formula $R_f(I)_x(Br)_y$, wherein $R_f$ is a (per)fluoroalkyl or a (per)fluorochloroalkyl having from 1 to 8 carbon atoms, while x and y are integers comprised between 0 and 2, with $1 \leq x+y \leq 2$ (see for example U.S. Pat. Nos. 4,243,770 and 4,943,622). It is also possible to use as chain transfer agents iodides and/or bromides of alkaline or alkaline-earth metals, according to U.S. Pat. No. 5,173,553.

The crosslinking of step 5a) can take place by both ionic and radical route. Also a mixed crosslinking can be used. Preferably crosslinking takes place by peroxidic route, wherefore the ionomers must contain radical attack sites in the chain and/or in terminal position of the macromolecules, for example iodine and/or bromine atoms. The radical crosslinking can take place also on the carbon atoms of the bis-olefin when the ionomer contains said unit.

The crosslinking of ionic type takes place according to known methods of ionomers in the prior art. For example for the crosslinking of sulphonic ionomers a crosslinking agent is added which allows the reaction between two groups $-SO_2F$. See patent application WO 99/38897.

Preferably the crosslinking of radical type uses ionomers containing units of the bis-olefin of formula (I) and iodine in the terminal position of the macromolecule chains.

When the sulphonic ionomer of the invention is crosslinked by radical way, one operates at the known temperatures of the prior art depending on the type of peroxide used, by addition of a suitable peroxide capable to generate radicals by heating. Generally, the peroxide amount is comprised between 0.1% and 10% by weight with respect to the polymer. Among the peroxides we can mention: dialkylperoxides, such for example di-terbutyl-peroxide and 2,5-dimethyl-2,5-di(terbutylperoxy)hexane; dicumyl peroxide; dibenzoyl peroxide; diterbutyl perbenzoate; di-1,3-dimethyl-3-(terbutylperoxy)butylcarbonate. Other peroxidic systems are described, for example in patents EP 136,596 and EP 410,351.

The crosslinking composition can furthermore contain:
(a) a crosslinking co-agent, in an amount in the range 0.5–10%, preferably 1–7% by weight with respect to the polymer; among them we can mention: triallyl-cyanurate; triallyl-isocyanurate (TAIC); tris(diallylamine)-s-triazine; triallylphosphite; N,N-diallyl-acrylamide; N,N-,N',N'-tetraallyl-malonamide; trivinyl-isocyanurate; 2,4,6-trivinyl-methyltrisiloxane; N,N'bisallylbicyclo-oct-7-ene-disuccinimide (BOSA); bis olefin of formula (I), triazine;
(b) a metal compound, in an amount in the range 1–15%, preferably 2–10%, by weight with respect to the polymer, selected from oxides or hydroxides of divaleit metals, such as for example Mg, Zn, Ca or Pb, optionally combined with a weak acid salt, such for example stearates, benzoates, carbonates, oxalates or phosphites of Ba, Na, K, Pb, Ca;
(c) other conventional additives, such as thickeners, pigments, antioxidants, stabilizers and the like;
(d) inorganic or polymer reinforcing fillers, preferably PTFE optionally fibrillable. Preferably the PTFE fillers have a size from 10 to 100 nm, preferably 10–60 nm.

To carry out the crosslinking in step 5a) the crosslinking composition is dispersed in a fluorinated solvent, for example perfluoropolyether, optionally containing one or two hydrogens in the chain end groups, for example Galden®, then the membrane obtained in step 4) is dipped and the crosslinking is carried out by heating at a temperature from 100° C. to 200° C. The solvents usable to disperse the crosslinking composition can also be used in admixture with other solvents, for example tetrahydrofuran.

The latexes usable in the process according to the present invention contain particles having an average diameter from 5 to 400 nm, preferably from 20 to 100 nm. The average diameter is determined as indicated in the Examples. The average diameter of the latex particles which can be used depends on the support pore sizes. For a support having pore sizes of 0.2 micron the latex must have an average particle diameter lower than 200 nm.

Said latexes are obtained by polymerization of the monomers in aqueous emulsion according to well known methods of the prior art, in the presence of radical initiators (for example alkaline or ammonium persulphates, perphosphates, perborates or percarbonates), optionally in combination with ferrous, cupreous or silver salts, or of other easily oxidizable metals.

In the colloidal aqueous dispersion of the ionomeric thermoplastic polymers also surfactants of various types are usually present, among which the fluorinated surfactants of formula:

$$R_f-X^-M^+$$

are particularly preferred, wherein $R_f$ is a $C_5-C_{16}$ (per)fluoroalkyl chain or a (per)fluoropolyoxyalkylene chain, $X^-$ is $-COO^-$ or $-SO_3^-$, $M^+$ is selected from: $H^+$, $NH_4^+$, an alkaline metal ion. Among the most commonly used we remember; ammonium perfluorooctanoate, (per)fluoropolyoxyalkylenes ended with one or more carboxylic groups, etc.

The polymerization reaction is generally carried out at temperatures in the range 25–120° C., under a pressure up to 3 MPa.

The polymerization is preferably carried out by using a dispersion or microemulsion of perfluoropolyoxyalkylenes, according to U.S. Pat. Nos. 4,789,717 and 4,864,006.

The surfactants used in step 2b) can be non-ionic, ionic or amphoteric surfactants. Mixtures of anionic and non-ionic surfactants are preferably used.

The hydrophobic portion of the surfactant molecule can be of hydrocarbon, fluorocarbon, fluoropolyether or silicon type.

Examples of surfactant agents are ethoxylated mono-, di- and trialkylphenols with number of ethoxylic units (EO) comprised between 3 and 50 and $C_4$–$C_9$ alkyl chains; ethoxylated fat alcohols with number of EO units comprised between 3 and 50 and $C_8$–$C_{36}$ alkyl chains; ammonium or alkaline metal salts of $C_8$–$C_{12}$ alkyl sulphates; hemiesters of the sulphuric acid with ethoxylated $C_{12}$–$C_{18}$ alkanols with number of EO units comprised between 4 and 50; $C_{12}$–$C_{18}$ alkylsulphonic acids or alkylaryl sulphonic acids having 6 carbon atoms of the aromatic ring and $C_9$–$C_{18}$ alkyl chains.

An example of non ionic surfactant is the octylphenoxy-polyethoxyethanol compound with number of ethoxylic units comprised between 9 and 10, sold by Rohm & Haas with the trademark Triton®X100.

Other examples of surfactants usable in the invention process are the ethers of the bis(phenylsulphonic) acid and its ammonium and alkaline metal salts, containing a $C_4$–$C_{24}$ alkyl chain on one or both the aromatic rings.

Said compounds are known and are obtained as described for example in U.S. Pat. No. 4,269,749.

The used fluorinated surfactants can be those used in the polymerization in aqueous emulsion for obtaining latexes.

Specific examples of said surfactants are: ammonium perfluorooctanoate, (per)fluoropolyoxyalkylenes ended with one or two carboxylic groups.

As said, in step 3b) the surface tension control is carried out by using surfactants. For example when Triton® is used, amounts from 1% to 20% by weight with respect to the latex, still more preferably from 3% to 10%, are added to the latex.

In step 2a) of the invention process the used colloidal dispersion can be prepared at various polymer concentrations by addition or removal of water. In the last case, to avoid the latex coagulation, surfactants of the above type can be added, using for example concentration processes by phase separation, obtaining a phase richer in polymer with respect to the starting latex.

In step 3) of the invention process the support impregnation can take place by immersion in the concentrated latex, optionally in the presence of mechanical stirring, or the impregnation can be carried out by other methods, such as for example application by brush, spray gun, roll or by any other conventional impregnation method. Preferably the method by immersion is used, more preferably Triton®X100 in step 2b) in an amount from 1 to 10% by weight and with an ionomer content in the dispersion higher than or equal to 20% by weight. By operating under said conditions the impregnation of the porous support is obtained with the maximum amount of ionomer already with only one passage (i.e. carrying out steps 3) and 4) only once).

At the end of step 4), as said, it is preferable that the membrane satisfies test ASTM D726-58 and be transparent since said last characteristic shows that the support pores have been completely filled, When the membrane is opaque, this is an index that the support pores are not completely filled by the ionomer.

The ionomer functional group conversion into the corresponding saline form, step 5b), is followed by IR spectroscopy. Step 5) ends when the band area of the $SO_3^-$ group, about 1060 cm$^{-1}$, or that of the $COO^-$ group, about 1,680 cm$^{-1}$, remains constant.

The optional step 6) is carried out when the membrane must be used as separator in fuel cells. Said step is optional when the membrane is used in other electrochemical applications wherein the use of membranes is required in which the ionomer acid groups are salified, as for example in the case of lithium ion batteries, for example, for the application in fuel cells.

Optionally, at the end of the process (step 6) according to the present invention a further heating step can be effected (post-treatment—step 7) at temperatures from 150° C. to 210° C., to lower the amount of material extractable during the membrane use in the cells and avoid variations in the performances of the cells themselves.

As said, the invention process allows the membrane impregnation avoiding the preparation of solutions of the (per)fluorinated ionomer in acid form, and therefore the corrosion problems shown by the processes of the prior art which include said step, are removed.

Besides, in the process according to the present invention it is possible to use latexes having a high concentration. In this way it is possible to decrease the passages required to obtain a membrane containing high amounts of polymer (ionomer).

The following Examples illustrate the present invention without limiting the application scope thereof.

EXAMPLES

Characterization

Determination of the Ionomeric Polymer Tg Having Groups Convertible into Acid Form The glass transition temperature is the temperature corresponding to the maximum of the loss modulus, mechanically measured according to DIB 53545 with the torsional ARES® Rheometric pendulum, having forced swings at the frequency of 1 Hz, with a, temperature gradient of 2° C./min.

Determination of the Latex Surface Tension

The surface tension has been determined at 25° C. by the Du Nouy method according to the ASTM D 1131 method, by using the Huh and Mason correction factors.

Determination of the Air Permeability (Gurley Number)

The Gurley test of permeability to air determines the time in seconds necessary to obtain the flow of 100 ml of air under a pressure corresponding to that exerted by a 12 cm water column through a membrane having a surface of 6.45 cm$^2$ (1 sq in). The measurement is carried out in a Gurley type porosimeter (ASTM D726-58). The specimen is fixed on the instrument cylinder and fastened among the sealing plates. The cylinder is then let softly go down. The automatic chronometer, joined to a photocell, is used to record the time (seconds) necessary to the discharge from the cylinder of the air volume of 100 ml through the membrane. This time is indicated as Gurley number.

Determination of the Ionomer Amount in the Membrane

The ionomer amount present in the tested specimen is calculated by weighing, knowing the initial weight of the membrane.

Determination of the Average Diameter of the Solid Particles in the Latex

The measurement of the particle diameter has been carried out by the dynamic light diffusion method, measuring the hydrodynamic radius with the instrument formed by the goniometer BI200SM and by the correlator BI9000AT, sold by Brookhaven Instrument Co.

Determination of the Thickness of the Impregnated Membrane

The thickness has been determined by micrometer Mitutoyo Digimatic Indicator® type IDF-130.

Examination of the Support Morphology

The support morphology has been examined by scanning electronic microscopy using a Cambridge® S200 microscope, with a 5200× magnification.

Example 1

Preparation of a Membrane Completely Occluded to Gases with the Invention Process Containing 62% by Weight of Ionomer with —$SO_3H$ Functional Groups, Having an Equivalent Weight of 842 g/eq A foamed PTFE support GORE-TEX® GMP 20233, having an average pore diameter of 0.2 μm, as specified by the manufacturer, and a thickness of 40±5 μm, is mounted on a PTFE circular support having an internal diameter of 60 mm.

The Gurley number is of 9.6 s., whereby the support is porous, not occluded to gases.

Polymerization Latex

In a 2 liter autoclave the following reactants are introduced:

1300 ml of demineralized water;
45 g of the monomer of formula $CF_2=CF-O-CF_2CF_2-SO_2F$;
31.5 ml of a microemulsion of perfluoropolyoxyalkylenes previously obtained by mixing:
   8.9 ml of a perfluoropolyoxyalkylene having an acid end group of formula:

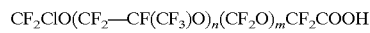

$CF_2ClO(CF_2-CF(CF_3)O)_n(CF_2O)_mCF_2COOH$ wherein n/m=10 having average molecular weight 600;
   4.1 ml of a perfluoropolyether oil Galden® D02 of formula $CF_3O(CF_2-CF(CF_3)O)_n(CF_2O)_mCF_3$
wherein n/m=20 having average molecular weight 450;
   4.1 ml of an aqueous solution of $NH_4OH$ 30% by volume;
   16.4 g of water.

The autoclave, kept under stirring at 700 rpm, was heated to 75° C. Then 0.13 g of ammonium persulphate are fed into the autoclave. The pressure is brought to 11 relative bar (1.1 MPa) by introducing TFE. The reaction starts after 1 min. During the polymerization, 7.5 ml of the sulphonic monomer of formula $CF_2=CF-O-CF_2CF_2-SO_2F$ are added every 21 g of fed TFE. The total mass of TFE fed to the reactor is equal to 400 g. The reaction is stopped after 1,600 min from the starting by decreasing the stirring, cooling the reactor and venting the TFE. The produced latex has a solid content of 26.9% by weight, the particles have an average diameter of 66 nm.

The polymer composition determined by titration results to be 84.9% molar of TFE and 15.1% molar of sulphonic monomer, equal to an equivalent weight of 842.

The glass transition temperature (Tg) is 31° C.

The latex has a surface tension of 45 mN/m.

The obtained latex is subsequently added with Triton®X100 (Rohm and Haas®) so to have, after concentration, the surfactant amount indicated hereinafter.

An amout of water was then removed by evaporation such to obtain in the latex a polymer concentration of 44.4% by weight and a content in Triton®X100 of 4.86 by weight. The latex has a surface tension of 23 mN/m.

The membrane is impregnated (step 3)) by immersion in the latex for a time of 5 minutes. After having removed the latex excess by drying using a blotting paper, the membrane has been put in a ventilated stove at 150° C. for a time of 60 s (step 4)). A transparent membrane occluded to the gas flow is obtained according to the test ASTM D726-58 (Gurley>10,000 s). The ionomer content by weight in the sulphonyl fluoride form is equal to 61%.

To convert the —$SO_2F$ groups into —$SO_3H$, the occluded membrane was first immersed for 4 hours in an aqueous solution of NaOH 10% by weight at 80° C. The time was determined by IR spectroscopy following the increase of the band area of the $SO_3^-$ group as indicated in the description.

The ionomer content by weight in the $SO_3^-Na^+$ form is equal to 67%.

After an intermediate washing in distilled water, the membrane was immersed in a HCl solution 20% by weight at room temperature for 24 hours. At the end the membrane was washed more times in distilled water till an about neutral pH of the washing waters.

At the end of this process the total measured thickness of the transparent membrane is of 30±4 μm; the ionomer content is 61% with respect to the membrane total weight, and the Gurley number is higher than 10,000 seconds. Therefore the membrane is completely occluded to the gas flow.

Example 2

Preparation of a Membrane Occluded to Gases Containing 60% by Weight of Ionomer with Functional —$SO_3H$ Groups and Equivalent Weight 842 g/eq The process of Example 1 is repeataed until the latex concentration step. The latex was added with an amount of Triton®X100 equal to 7% by weight of the dispersion.

The latex was then heated for 6 hours at about 65° C. Said temperature is higher than the cloud point of the system. After having allowed to slowly cool for a whole night, the latex separates in two phases: the upper phase is removed and the lower phase, having a polymer concentration of 33% by weight and Triton of 6% by weight, is used to impregnate the porous membrane.

The surface tension is of 22 mN/m.

The impregnation process (step 3)) is carried out as in Example 1. In step 4) the drying temperature is 160° C. and the duration is 90 s.

A transparent membrane occluded to the gas flow is obtained according to the test ASTM D726-58 (Gurley number>10,000).

The conversion of the —$SO_2F$ groups into —$SO_3H$ has been carried out by using an aqueous solution of KOH at 10% by weight at 90° C. for 4 hours.

The thickness of the occluded transparent membrane is of 26±5 μm, the ionomer content is 60% with respect to the membrane weight, the Gurley number is higher than 10,000 seconds. Therefore the membrane is completely occluded to the gas flow.

Example 3

Preparation of a Membrane Occluded to Gases Containing 63% by Weight of Ionomer with Functional —SO₃H Groups and Equivalent Weight of 1,100 g/eq A foamed PTFE membrane is used as in Example 1.

A polymerization latex is prepared in microemulsion according to the following procedure.

In a 2 liter autoclave the following reactants are introduced:
- 1,200 ml of demineralized water;
- 74 g of the monomer of formula $CF_2=CF-O-CF_2CF_2-SO_2F$;
- 29.4 ml of a microemulsion of perfluoropolyoxyalkylenes obtained by mixing:
  - 8.9 ml of a perfluoropolyoxyalkylene having an acid end group of formula:

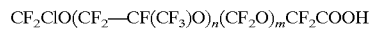

wherein n/m=10 having average molecular weight 600;
  - 3.9 ml of a perfluoropolyether oil Galden® D02 of formula $CF_3O(CF_2-CF(CF_3)O)_n(CF_2O)_mCF_3$
  wherein n/m=20 having average molecular weight 450;
  - 3.9 ml of an aqueous solution of $NH_4OH$ 30% by volume;
  - 15.2 g of water.

The autoclave, kept under stirring at 700 rpm, was heated to 75° C. Then 50 ml of a solution 0.4 g/liter of ammonium persulphate are fed into the autoclave. The pressure is brought to 13 relative bar (1.3 MPa) by introducing TFE. The reaction starts after 1 min. During the polymerization, 5.3 ml of the sulphonic monomer of formula $CF_2=CF-O-CF_2CF_2-SO_2F$ are added every 7.5 g of fed TFE. The total mass of TFE fed to the reactor is equal to 150 g. The reaction is stopped after 1,600 min from the starting, by decreasing the stirring, cooling the reactor and venting the TFE. The produced latex has a solid content of 160 by weight, a surface tension of 44 mN/m and the particles have an average diameter of 63 nm.

The polymer composition determined by titration results to be 89.1% molar of TFE and 10.9% molar of sulphonic monomer, equal to an equivalent weight of 1,100 g/moles or g/eq.

The glass transition temperature (Tg) is 46° C.

The latex, after having been additioned with Triton®X100 is concentrated by evaporating the water until having a polymer concentration equal to 32.2% by weight and a content of Triton®X100 equal to 7.5% by weight.

The surface tension is 22 mN/m.

The membrane was impregnated (step 3)) as in Example 1.

In step 4) a drying temperature of 160° C. for a time of 90 s was used.

At the end of step 4) a transparent membrane occluded to the gas flow is obtained according to the test ASTM D726-58 (Gurley number>10,000 s).

The conversion of the functional groups has been effected under the conditions described in Example 1.

The thickness of the transparent membrane is of 24±2 μm and the ionomer content is 63% with respect to the weight of the membrane. The membrane has a Gurley number higher than 10,000 seconds and therefore it is completely occluded to the gas flow.

Example 4

Determination of the Membrane Conductance of Example 1 in a Fuel Cell

The membrane of Example 1 is tested in a fuel cell with active area 10 cm² at 75° C., operating with hydrogen and air at 2.5 absolute atm on both electrodes, and humidifying the gases fed at 80° C. The conductance is determined at a current density of 0.5 A/cm² and results to be of 0.7 A/(cm²XV).

Said value is substantially that required in the applications of the fuel cells.

Example 5

Preparation of a Membrane Occluded to Gases Carrying Out, at the End of the Invention Process, Thermal Post-treatments at Different Temperatures The membrane of Example 1 has been used. The membrane was divided in four parts. Three parts were put in a ventilated stove at temperatures of 150°, 180° and 210° C., respectively, for a time of 3 min. The specimens were then dried under vacuum at room temperature for 24 hours and then immersed in boiling water for 30 min. At the end of this period the membranes have been weighed to determine the amount of absorbed water. Finally they were dried again under vacuum at room temperature for 24 hours, and then the membrane weight was detrmined. The variation by weight of each of the four parts of the membrane after hydration in boiling water and after the final drying is reported in Table 1, wherein also the Gurley number is reported.

The Table shows that the thermal treatment decreases the amount of extractable ionomer in boiling water.

The thermally treated parts of the membrane at the end of the test were transparent as that untreated.

Example 6 (Comparative)

Impregnation of a Membrane Using a Latex as Obtained by the Polymerization Process, Without Surfactant Addition The impregnation process described in Example 1 is repeated, by using an aliquot of the same latex at the concentration 26.9% by weight of polymer. The impregnation step (3) by immersion has a duration of 4 hours.

Steps (3)+(4) have been repeated further two times. The conversion step is like that described in Example 1.

The content of final ionomer in the membrane is 11% by weight, the membrane thickness 26±2 μm, the Gurley number 12 s, whereby the membrane is not occluded to the gas flow even though step 4 of the present invention has been carried out.

Example 7

Preparation of a Membrane Using a Latex Having a Solid Concentration of 10% and a Surfactant Concentration of 3% by Weight The membrane and the latex used are those of Example 1. The latex has been diluted until a polymer concentration of 10% by weight and then added with an amount of surfactant Triton®X100 equal to 3% by weight based on the dispersion.

The surface tension is 24 mN/m.

Steps 3) and 4) have been carried out under the conditions described in Example 1, determining the increase by weight of the membrane and the Gurley number after each step.

It is necessary to carry out the process on the whole 8 times to obtain a membrane occluded to the gas flow, having an ionomer content of 41% as percentage by weight with respect to the membrane.

In this Example steps (5) and (6) have not been carried out.

Example 8

Preparation of a Membrane Starting from a Latex Having Concentration 16% by Using a Surfactant Concentration of 3% by Weight

Example 7 is repeated but diluting the latex of Example 1 until a polymer concentration of 16% by weight.

The surface tension is 24 mN/m.

An occluded and transparent membrane is obtained after having carried out three times on the whole steps (3)+(4). The ionomer percentage is 42% by weight with respect to the membrane total weight.

Example 9

Preparation of a Membrane Starting from a Latex Having Concentration 28% by Using a Surfactant Concentration of 3% by Weight

Example 7 is repeated but concentrating by evaporation the latex of Example 1 until a polymer concentration of 28% by weight with respect to the membrane.

The surface tension is 23 mN/m.

An occluded and transparent membrane is obtained after having carried out steps (3)+(4) only once. The ionomer percentage is 45% by weight with respect to the membrane total weight.

The surface tension is 22 mN/m.

Example 10

Preparation of a Membrane Starting from a Latex Having Concentration 40% by Using a Surfactant Concentration of 3% by Weight

Example 7 is repeated but concentrating by evaporation the latex of Example 1 until a polymer concentration of 40% by weight.

The surface tension is 24 mN/m.

An occluded transparent membrane is obtained after having carried out steps (3)+(4) only once. The ionomer percentage is 57% by weight with respect to the membrane total weight.

Example 11

Preparation of a Membrane Starting from a Latex Having Concentration 28% by Using a Surfactant Concentration of 1% by Weight

The latex of Example 1 concentrated by evaporation at 28% is added with an amount of surfactant Triton®X100 equal to 1% by weight based on the dispersion weight.

The surface tension is 25 mN/m.

Steps 3) and 4) have been carried out under the conditions described in Example 1.

An occluded transparent membrane is obtained after having carried out steps (3)+(4) only once. The ionomer percentage is 44% by weight with respect to the membrane total weight.

Example 12 (Comparative)

Effect of the Thermal Treatment at 300° C. on a Porous Support Usable in the Process According to the Present Invention

A small disc having 40 mm diameter, obtained by the porous support used in Example 1 was put in a ventilated stove at 300° C. for one hour.

At the end of the test, after cooling, it was noticed that the article shape had become similar to that of an ellipse, having the minor axis of 26.5 mm and the major axis of 32 mm.

The article morphology, before and after the treatment, has been evaluated by electronic microscopy. The article after treatment shows a remarkable reduction of the pore sizes with an evident coalescence of the fibrils initially present in the support. See FIGS. 1 and 2 which refer to the support before and after the treatment, respectively.

Therefore the thermal treatments at the indicated temperatures modify the initial structure of the support so that it is no longer usable.

Example 13 (Comparative)

Impregnation of the Porous Support with Latex as Such According to U.S. Pat. No. 4,791,081 (Example 1)

A foamed PTFE membrane Gore®Tex, like that used in Example 1 of the present invention, was immersed in a dispersion obtained by diluting 12 g of the same latex described in Example 1 of the present invention in 50 ml of deionized water.

The surface tension is 46 mN/m.

The water was slowly removed, heating, under stirring. Subsequently the membrane was heated in a stove to 250° C. for 20 minutes.

At the end of this process the membrane is opaque and shows accumulation zones of ionomer, which are easily removed in the subsequent hydrolysis and acidification treatments according to the present invention process.

The Gurley number is of 12 seconds, whereby the membrane is not occluded. The so obtained membrane cannot therefore be used for the applications expected in the preseent invention.

Example 14

Example 11 has been repeated but by adding an amount of surfactant Triton®X100 equal to 0.3% by weight.

The surface tension is 37 mN/m.

Steps 3) and 4) have been carried out under the conditions described in Example 1.

An occluded but opaque membrane is obtained after having repeated 5 times on the whole steps (3)+(4). The ionomer percentage is 40% by weight with respect to the membrane total weight.

Example 15

Example 11 has been repeated but by adding an amount of surfactant Triton®X100 equal to 0.6% by weight.

The surface tension is 30 mN/m.

Steps 3) and 4) have been carried out under the conditions described in Example 1.

An occluded but opaque membrane is obtained after having repeated 4 times on the whole steps (3)+(4). The ionomer percentage is 45% by weight with respect to the membrane total weight.

Example 16

Example 11 has been repeated but by adding an amount of perfluoropolyether surfactant having molecular weight about 500 with —COO$^-$NH$_4^+$ end group equal to 0.3% by weight.

The surface tension is 34 mN/m.

Steps 3) and 4) have been carried out under the conditions described in Example 1.

An occluded but opaque membrane is obtained after having repeated 5 times in the whole steps (3)+(4). The ionomer percentage is 45% by weight with respect to the membrane total weight.

Example 17

Example 11 has been repeated but by adding an amount of perfluoropolyether surfactant having molecular weight about 500 with —COO$^-$NH$_4^+$ end group equal to 1% by weight.

The surface tension is 21 mN/m.

Steps 3) and 4) have been carried out under the conditions described in Example 1.

An occluded but opaque membrane is obtained after having repeated 3 times on the whole steps (3)+(4). The ionomer percentage is 45% by weight with respect to the membrane total weight.

TABLE 1

Example 5 - membrane divided in 4 parts: for each part the treatment temperature (T), the increase % by weight after the hydration step (Δp), the lost ionomer percentage (ΔI) and the Gurley number (NG) are reported

| Parts | T (° C.) | Δp % | ΔI % | NG |
|---|---|---|---|---|
| 1 | no treatment | 13 | 16.1 | >10$^4$ |
| 2 | 150 | 21 | 12.9 | >10$^4$ |
| 3 | 180 | 21 | 9.7 | >10$^4$ |
| 4 | 210 | 21 | 4.5 | >10$^4$ |

What is claimed is:

1. An impregnation process of a porous support, formed by a polymer compound inert under use conditions, carried out by using colloidal dispersions in water of thermoplastic (per)fluorinated ionomeric polymers containing functional groups convertible into —SO$_3$H, said aqueous dispersions of thermoplastic (per)fluorinated ionomeric polymers obtained by polymerization in emulsion of the following monomers:
   (A) one or more (per)fluorinated monomers, containing at least one ethylene unsaturation,
   (B) one or more (per)fluorinated comonomers containing functional groups convertible into the above acid groups, and
   (C) 0.01 to 5% by moles of a bis-olefin of formula

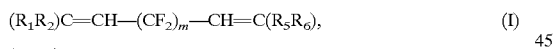

(R$_1$R$_2$)C=CH—(CF$_2$)$_m$—CH=C(R$_5$R$_6$), (I)

wherein;
   m is an integer from 2 to 10;
   R$_1$, R$_2$, R$_5$, and R$_6$ are equal to or different from each other, and are H or C$_1$–C$_5$ alkyl groups, said process comprising the following steps:
1) preparation of an aqueous colloidal dispersion of thermoplastic (per)fluorinated polymers by polymerization in emulsion of at least the following monomers:
   (A) one or more (per)fluorinated monomers, containing at least one ethylene unsaturation;
   (B) one or more (per)fluorinated comonomers containing functional groups convertible into the above acid groups; and
   (C) 0.01 to 5% by moles of a bis-olefin of formula; (R$_1$R$_2$)C=CH—(CF$_2$)$_m$CH=C(R$_5$R$_6$) (I)
2) a) concentration or dilution of the dispersion obtained in 1) having a solid content in the latex greater than 20% by weight; and
   b) optional addition of surfactants to obtain a dispersion surface tension lower than 40 mN/m;
3) impregnation of the porous support with the latex obtained in 2b);
4) thermal treatment at a temperature of 20° C. higher than the glass transition temperature of the thermoplastic ionomeric polymers and lower or equal to 200° C.;
5) a) ionomer crosslinking when the equivalent weight is lower than 650 g/eg, and
   b) conversion of the functional groups of the thermoplastic ionomeric polymers into the corresponding salts, by contacting the membrane with a basic aqueous solution, at temperatures comprised between 60° C. and the boiling temperature of the aqueous solution, and subsequent washings by immersion of the membrane in deionized water at room termperature, until obtaining an almost neutral pH of the washing waters;
6) optionally, membrane treatment by immersion at room temperature in an acid aqueous solution of an inorganic strong acid, and subsequent washings by immersion in deonized water up to an about neutral pH of the washing waters.

2. The process according to claim 1, wherein the crosslinking of step 5a) is optional when the polymer has equivalent weight higher than 650 g/eq.

3. The process according to claim 1, wherein steps 3) and 4) are repeated until obtaining a completely occluded membrane with Gurley number>10,000 (ASTM D726-58).

4. The process according to claim 1, wherein the porous support is a membrane having (a) a porous structure containing knots linked each other by fibrils, and/or (b) a porous structure formed by only interconnected fibrils, or (c) a tissue.

5. The process according to claim 1, wherein the thermoplastic (per)fluorinated polymers have equivalent weight from 380 to 1,800.

6. The process according to claim 1, wherein in thermoplastic polymers the (per)fluorinated monomers of type (A) are selected from the following:
   vinylidene fluoride (VDF);
   C$_2$–C$_8$ perfluoroolefins;
   C$_2$–C$_8$ chioro- and/or bromo- and/or iodo-fluoroolefins, such as chlorotrifluorethylene (CTFE) and bromotrifluorethylene;
   perflucroalkylvinylethers (PAVE) CF$_2$=CFOR$_f$, wherein R$_f$ is a C$_1$–C$_6$ perfluoroalkyl;
   perflucro-oxyalkylvinylethers CF$_2$=CFOX, wherein X is a C$_1$–C$_{12}$ perfluoro-oxyalkyl having one or more ether groups
the fluorinated monomers of type (B) are selected from one or more of the following:
   F$_2$C=CF—O—CF$_2$—CF$_2$—SO$_2$F;
   F$_2$C=CF—O—[CF$_2$—CXF—O]$_n$—CF$_2$—CF$_2$—SO$_2$F; wherein X=Cl, F or CF$_3$; n=integer from 1 to 10;
   F$_2$C=CF—O—CF$_2$—CF$_2$—CF$_2$—SO$_2$F;
   F$_2$C=CF—Ar—SO$_2$F wherein Ar is an aryl ring.

7. The process according to claim 6, wherein the fluorinated ionomers comprise:
   monomeric units deriving from TFE;
   monomeric units deriving from CF$_2$=CF—O—CF$_2$CF$_2$SO$_2$F;
   monomeric units deriving from the bis-olefin of formula (I);
   optionally, iodine atoms in terminal position.

8. The process according to claim 1, wherein the crosslinking of step 5a) can take place by both ionic and radical route.

9. An impregnation process of a porous surpport, formed by a polymer compound inert under use conditions, carried out by using colloidal dispersions in water of thermoolastic (per)fluorinated polymers containing functional groups convertible into —SO₃H, said agueous dispersions of thermoplastic (per)fluorinated polymers obtained by polymerization in emulsion of the following monomers:
(A) one or more (per)fluorinated monomers, containing at least one ethylene unsaturation, and
(B) one or more (per)fluorinated comonomers containing functional groups convertible into the above acid groups, said process comprising the following steps:
1) preparation of an aaueous colloidal dispersion of thermoplastic (per)fluorinated polymers by polymerization in emulsion of at least the following monomers:
  (A) one or more (per)fluorinated monomers, containing at least one ethylene unsaturation; and
  (B) one or more (per)fluorinated comonomers containing functional groups convertible into the above acid groups; and
2) a) concentration or dilution of the dispersion obtained in 1) having a solid content in the latex areater than 20% by weight; and
  b) optional addition of surfactants to obtain a dispersion surface tension lower than 40 mN/m;
3) impregnation of the porous support with the latex obtained in 2b);
4) thermal treatment at a temperature of 20° C. higher than the glass transition temperature of the thermoplastic ionomeric polymers and lower or equal to 200° C.;
5) a) ionomer crosslinking when the equivalent weight is lower than 650 g/eg, and
  b) conversion of the functional groups of the ionomer into the corresponding salts, by contacting the membrane with a basic aqueous solution, at temperatures comprised between 60° C. and the boiling temperature of the aqueous solution, and subsequent washings by immersion of the membrane in deionized water at room termperature, until obtaining an almost neutral pH of the washing waters;
6) optionally, membrane treatment by immersion at room temperature in an acid aqueous solution of an inorganic strong acid, and subsequent washings by immersion in deonized water up to an about neutral pH of the washing waters, wherein the crosslinking of step 5a) takes place by both ionic and radical route and wherein the crosslinking of radical type uses ionomers containing units of the bis-olefin of formula (I) and iodine in the terminal position of the macromolecule chains.

10. An impregnation process of a porous support, formed by a polymer compound inert under use conditions, carried out by using colloidal dispersions in water of thermoplastic (per)fluorinated polymers containing functional groups convertible into —SO₃H,
said aqueous disoersions of thermoolastic (per)fluorinated polymers obtained by polymerization in emulsion of the following monomers:
(A) one or more (per)fluorinated monomers, containing at least one ethylene unsaturation, and
(B) one or more (per)fluorinated comonomers containing functional groups convertible into the above acid groups,
said process comprising the following steps:
1) preparation of an aqueous colloidal dispersion of thermoplastic (per)fluorinated polymers by polymerization in emulsion of at least the following monomers:
  (A) one or more (per)fluorinated monomers, containing at least one ethylene unsaturation; and
  (B) one or more (per)fluorinated comonomers containing functional groups convertible into the above acid groups; and
2) a) concentration or dilution of the disoersion obtained in 1) having a solid content in the latex greater than 20% by weight; and
  b) optional addition of surfactants to obtain a dispersion surface tension lower than 40 mN/m;
3) impregnation of the porous support with the latex obtained in 2b);
4) thermal treatment at a temperature of 20° C. higher than the glass transition temperature of the thermoplastic ionomeric polymer and lower or equal to 200° C.;
5) a) ionomer crosslinking when the equivalent weight is lower than 650 g/eg, and
  b) conversion of the functional groups of the ionomer into the corresponding salts, by contacting the membrane with a basic aqueous solution, at temperatures comprised between 60° C. and the boiling temperature of the agueous solution, and subsequent washings by immersion of the membrane in deionized water at room termperature, until obtaining an almost neutral pH of the washing waters;
6) optionally, membrane treatment by immersion at room temperature in an acid aqueous solution of an inorganic strong acid, and subsequent washings by immersion in deonized water up to an about neutral pH of the washing waters, wherein the crosslinking of step 5a) takes place by both ionic and radical route and wherein the crosslinking composition contains:
(a) a crosslinking co-agent, in an amount in the range 0.5–10% with respect to the polymer;
(b) a metal compound, in amounts in the range 1–15% by weight with respect to the polymer, selected from oxides or hydroxides of divalent metals, optionally combined with a weak acid salt;
(c) other conventional additives; and
(d) inorganic or polymer reinforcing fillers, optionally fibril fillers.

11. The process according to claim 1, wherein the latexes contain particles having a diameter from 5 to 400 nm.

12. The process according to claim 1, wherein in step 1) in the colloidal aqueous dispersion of the ionomeric thermoplastic polymers fluorinated surfactants are present, of formula:

wherein $R_f$ is a $C_5$–$C_{16}$ perfluoroalkyl chain or a perfluoropolyoxyalkylene chain, $X^-$ is —COO⁻ or —SO₃⁻, $M^+$ is selected from: $H^+$, $NH_4^+$, an alkaline metal ion.

13. The process according to claim 1, wherein the surfactants used in step 2b) are non-ionic, ionic or amphoteric surfactants or mixtures thereof, wherein the hydrophobic portion of the surfactant molecule can be of hydrocarbon, fluorocarbon, fluoropolyether or silicone type.

14. The process according to claim 13, wherein the surfactant is the octylphenoxypolyethoxyethanol compound with a number of ethoxylic units comprised between 9 and 10, in an amount from 1% to 20% with respect to the latex.

15. The process according to claim 1, wherein after step 6 a further heating step is effected at temperatures from 150° C. to 210° C.

* * * * *